(12) United States Patent
Zhou et al.

(10) Patent No.: US 12,636,783 B2
(45) Date of Patent: May 26, 2026

(54) ROBOTIC ARM, METHOD AND APPARATUS FOR CONTROLLING ROBOTIC ARM, ROBOT, AND STORAGE MEDIUM

(71) Applicant: TENCENT TECHNOLOGY (SHENZHEN) COMPANY LIMITED, Shenzhen (CN)

(72) Inventors: Cheng Zhou, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 127 days.

(21) Appl. No.: 18/472,517

(22) Filed: Sep. 22, 2023

(65) Prior Publication Data

US 2024/0009844 A1 Jan. 11, 2024

Related U.S. Application Data

(63) Continuation of application No. PCT/CN2022/138281, filed on Dec. 12, 2022.

(30) Foreign Application Priority Data

Jan. 28, 2022 (CN) ......................... 202210107236.X

(51) Int. Cl.
 *B25J 9/16* (2006.01)
(52) U.S. Cl.
 CPC .................................... *B25J 9/1664* (2013.01)
(58) Field of Classification Search
 CPC ...... B25J 9/1664; B25J 9/1612; B25J 11/008; B25J 15/0014; B25J 9/00; B25J 9/12;
 (Continued)

(56) References Cited

U.S. PATENT DOCUMENTS

2016/0023353 A1* 1/2016 Rodnick ................ B25J 13/083
 700/228
2019/0061154 A1 2/2019 Rosengren et al.
 (Continued)

FOREIGN PATENT DOCUMENTS

CN 101058182 A 10/2007
CN 103991077 A 8/2014
 (Continued)

OTHER PUBLICATIONS

Woodruff et al, "Planning and Control for Dynamic, Nonprehensile, and Hybrid Manipulation Tasks" , May 29-Jun. 3, 2017, 2017 IEEE International Conference on Robotics and Automation (Year: 2017).*
 (Continued)

*Primary Examiner* — Esvinder Singh
(74) *Attorney, Agent, or Firm* — Anova Law Group, PLLC

(57) ABSTRACT

A robotic arm includes: a robotic arm main body; a carrying component connected to the robotic arm main body; a driving motor; and a controller connected to the driving motor. The controller is configured to generate a control signal that controls the driving motor to drive the carrying component to move. Along with a movement of the carrying component and under actions of a friction and the gravity, a target object placed on the carrying component slides on an upper surface of the carrying component and slides away from the carrying component at a target position at a target speed.

20 Claims, 5 Drawing Sheets

(58) Field of Classification Search
CPC . B25J 9/161; B25J 13/00; B25J 9/1651; B25J 9/1656; B25J 9/1669; B25J 9/1697; B25J 11/0095; B25J 15/0019; G05B 2219/39343; G05B 2219/40042; G05B 2219/45084; G05B 2219/40011; G05B 2219/50344; G05B 2219/50345; G05B 2219/39517; G05B 2219/39341
See application file for complete search history.

(56) References Cited

U.S. PATENT DOCUMENTS

| | | | |
|---|---|---|---|
| 2021/0178599 A1 | 6/2021 | Furuya et al. | |
| 2022/0395986 A1 * | 12/2022 | Blank | B25J 9/042 |
| 2024/0010444 A1 * | 1/2024 | Saito | B65G 47/915 |
| 2024/0227210 A1 * | 7/2024 | Embertson | B25J 19/0091 |

FOREIGN PATENT DOCUMENTS

| | | |
|---|---|---|
| CN | 205660724 U | 10/2016 |
| CN | 107838924 A | 3/2018 |
| CN | 207669311 U | 7/2018 |
| CN | 108789441 A | 11/2018 |
| CN | 109424719 A | 3/2019 |
| CN | 109531620 A | 3/2019 |
| CN | 111618852 A | 9/2020 |
| CN | 112207794 A | 1/2021 |
| CN | 112978346 A | 6/2021 |
| JP | 2015044257 A | 3/2015 |

OTHER PUBLICATIONS

Selvaggio et al, "A Shared-Control Teleoperation Architecture for Nonprehensile Object Transportation", Jul. 8, 2021 (Year: 2021).*
Takeuchi et al, "Evaluation of Dynamical Model of Mobile Robot Including Slipping of Carrying Objects", 2003, Proceedings of the 2003 IEEWRSI Intl. Conference on Intelligent Robots and Systems Las Vegas, Nevada. Oct. 2003 (Year: 2003).*
The World Intellectual Property Organization (WIPO) International Search Report for PCT/CN2022/138281 Feb. 23, 2023 11 Pages (including translation).
China National Intellectual Property Administration (CNIPA) Office Action 1 for 202210107236.X Aug. 16, 2024 13 Pages (including translation).
The European Patent Office (EPO) The Extended European Search Report for Application No. 22923513.0 Jun. 16, 2025 15 Pages.
Michael Erdmann. "An exploration of nonprehensile two-palm manipulation." The International Journal of Robotics Research 17.5 (1998): 485-503.
Michael A. Erdmann et al., "An exploration of sensorless manipulation." IEEE Journal on Robotics and Automation 4.4 (2002): 369-379.
Florian Wirnshofer et al. "State estimation in contact-rich manipulation." 2019 International Conference on Robotics and Automation (ICRA). IEEE, 2019.

* cited by examiner

301

Obtain a friction coefficient between a target object on the carrying component and the carrying component

302

Construct a sliding mechanical model based on the friction coefficient, the sliding mechanical model being configured to indicate a relationship between a change of generalized coordinates of a motion system and a driving force on the motion system in a process that the carrying component carries the target object and moves, and the motion system including the carrying component and the target object

303

Obtain target control information based on the sliding mechanical model, the target control information including a motion trajectory of the carrying component and driving forces on the motion system at various moments

304

Drive the carrying component to move through the driving motor based on the target control information, so that with the movement of the carrying component and under actions of a friction and the gravity, the target object slides on an upper surface of the carrying component and slides away from the carrying component at a target position at a target speed

FIG. 3

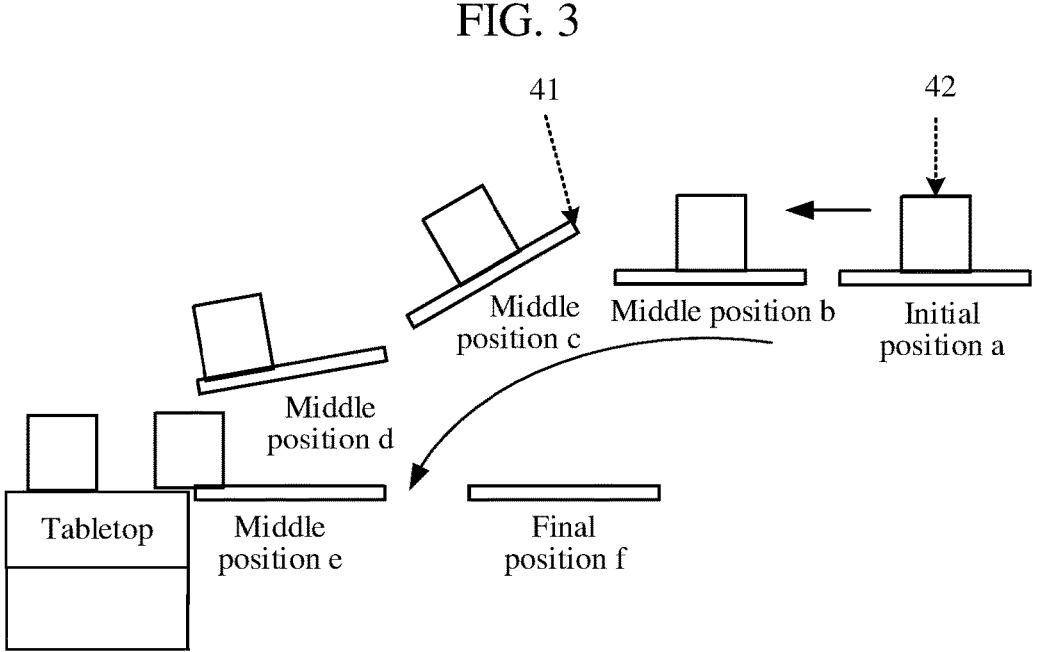

FIG. 4

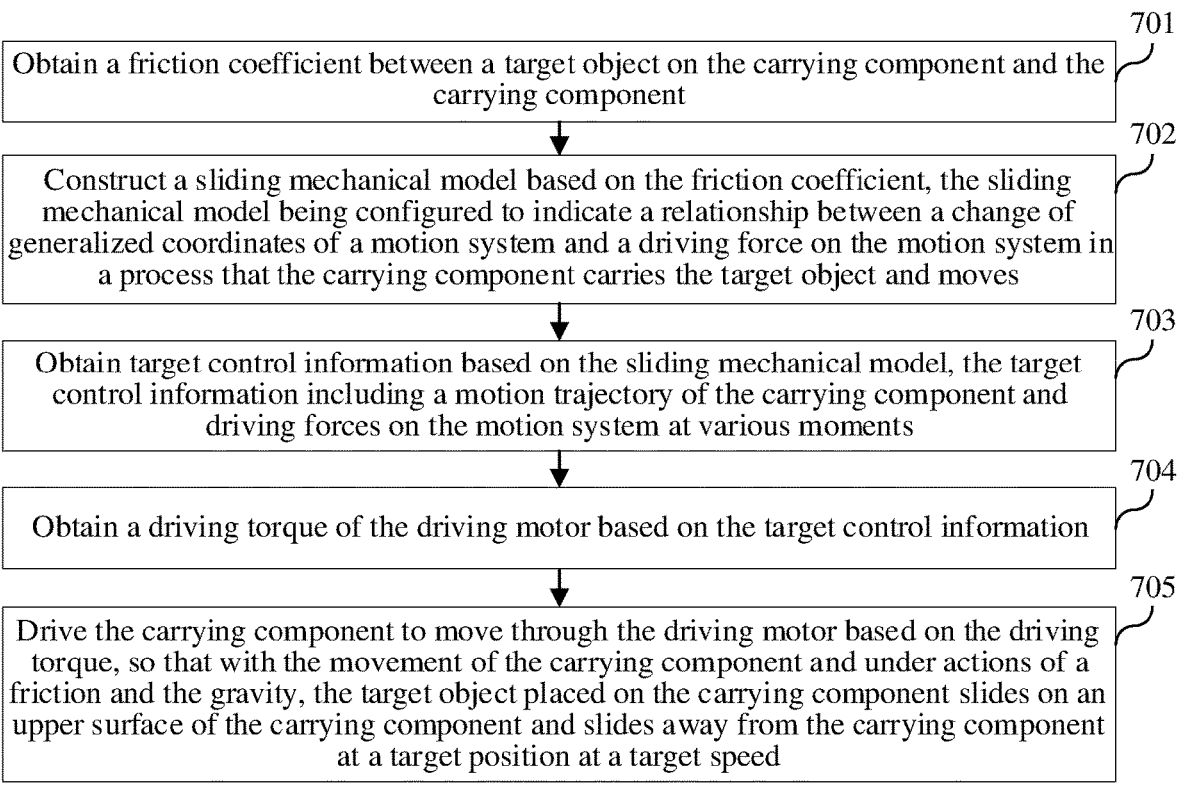

701

Obtain a friction coefficient between a target object on the carrying component and the carrying component

702

Construct a sliding mechanical model based on the friction coefficient, the sliding mechanical model being configured to indicate a relationship between a change of generalized coordinates of a motion system and a driving force on the motion system in a process that the carrying component carries the target object and moves

703

Obtain target control information based on the sliding mechanical model, the target control information including a motion trajectory of the carrying component and driving forces on the motion system at various moments

704

Obtain a driving torque of the driving motor based on the target control information

705

Drive the carrying component to move through the driving motor based on the driving torque, so that with the movement of the carrying component and under actions of a friction and the gravity, the target object placed on the carrying component slides on an upper surface of the carrying component and slides away from the carrying component at a target position at a target speed

FIG. 7

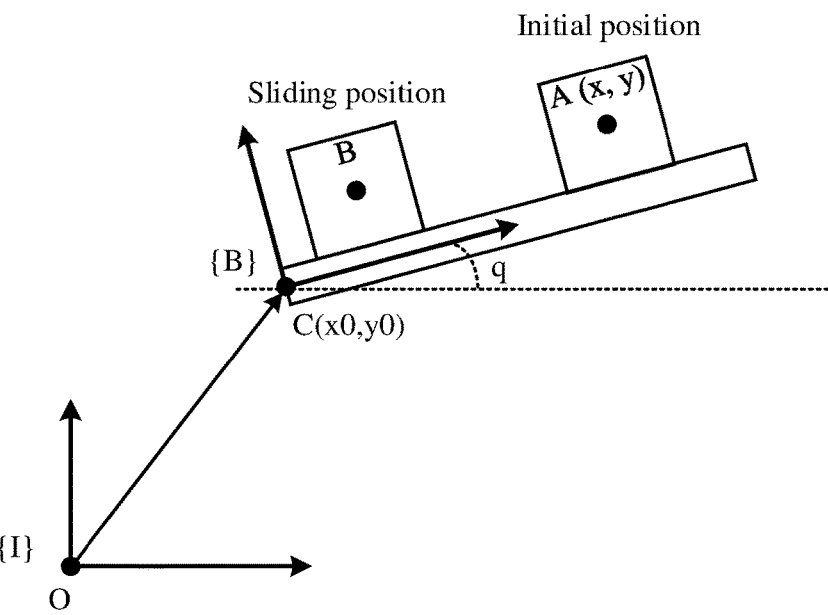

FIG. 8

ROBOTIC ARM, METHOD AND APPARATUS FOR CONTROLLING ROBOTIC ARM, ROBOT, AND STORAGE MEDIUM

CROSS-REFERENCES TO RELATED APPLICATIONS

This application is a continuation application of PCT Patent Application No. PCT/CN2022/138281, filed on Dec. 12, 2022, which claims priority to Chinese Patent Application No. 202210107236X, entitled "ROBOTIC ARM, METHOD AND APPARATUS FOR CONTROLLING ROBOTIC ARM, ROBOT, AND STORAGE MEDIUM" and filed with the China National Intellectual Property Administration on Jan. 28, 2022, the entire contents of both of which are incorporated herein by reference.

FIELD OF THE TECHNOLOGY

Embodiments of the present disclosure relate to the field of robot control, and in particular, to a robotic arm, a method and apparatus for controlling a robotic arm, a robot, and a storage medium.

BACKGROUND

With the continuous development of a robot control technology, more and more robots have a function of placing objects through robotic arms.

In a related technology, a robot uses an end effector (such as a robotic arm) to grasp a target object and place it at a designated position. The process of placing the target object by the robot is a quasi-static or static placement process. That is, the robotic arm brings the target object to the designated position through the end effector. When the robotic arm stops moving, the end effector is turned on, and the object is lowered.

However, in the object placement process in the related technology, the end effector needs to be turned on after the robotic arm hovers. As a result, the processes of moving and placing the object are not continuous and smooth motions, causing low efficiency of placing an object by a robot.

SUMMARY

Embodiments of the present disclosure relate to a robotic arm, a method and apparatus for controlling a robotic arm, a robot, and a storage medium, which can dynamically place a target object through the robotic arm and improve the efficiency of placing an object. The technical solutions are as follows:

One aspect provides a robotic arm, the robotic arm including: a robotic arm main body; a carrying component connected to the robotic arm main body; a driving motor; and a controller connected to the driving motor. The controller is configured to generate a control signal that controls the driving motor to drive the carrying component to move. Along with a movement of the carrying component and under actions of a friction and the gravity, a target object placed on the carrying component slides on an upper surface of the carrying component and slides away from the carrying component at a target position at a target speed.

One aspect provides a method for controlling a robotic arm, executed by a controller, the robotic arm including a carrying component, a robotic arm main body, and a driving motor, and the carrying component being connected to the robotic arm main body; the method including: obtaining a friction coefficient between a target object on the carrying component and the carrying component; constructing a sliding mechanical model based on the friction coefficient; the sliding mechanical model being configured to indicate a relationship between a change of generalized coordinates of a motion system and a driving force on the motion system in a process that the carrying component carries the target object and moves; the motion system including the carrying component and the target object; obtaining target control information based on the sliding mechanical model; the target control information including a motion trajectory of the carrying component and driving forces on the motion system at various moments; and driving the carrying component to move through the driving motor based on the target control information. Along with a movement of the carrying component and under actions of a friction and the gravity, the target object slides on an upper surface of the carrying component and slides away from the carrying component at a target position at a target speed.

Another aspect provides an apparatus for controlling a robotic arm, executed by a controller, the robotic arm including a carrying component, a robotic arm main body, and a driving motor, and the carrying component being connected to the robotic arm main body; the apparatus including: a coefficient obtaining module, configured to obtain a friction coefficient between a target object on the carrying component and the carrying component; a model construction module, configured to construct a sliding mechanical model based on the friction coefficient; the sliding mechanical model being configured to indicate a relationship between a change of generalized coordinates of a motion system and a driving force on the motion system in a process that the carrying component carries the target object and moves; the motion system including the carrying component and the target object; a control information obtaining module, configured to obtain target control information based on the sliding mechanical model; the target control information including a motion trajectory of the carrying component and driving forces on the motion system at various moments; a driving control module, configured to: drive the carrying component to move through the driving motor based on the target control information, so that with the movement of the carrying component under actions of a friction and the gravity, the target object placed on the carrying component slides on an upper surface of the carrying component and slides away from the carrying component at a target position at a target speed.

Another aspect provides a robot, the robot including the above-mentioned robotic arm; the controller in the robotic arm being configured to perform the above-mentioned method for controlling the robotic arm.

Another aspect provides a non-transitory computer-readable storage medium. The storage medium stores at least one instruction, at least one program, and a code set or an instruction set, the at least one instruction, the at least one program, the code set or the instruction set being loaded and executed by one or more processors to implement the method for controlling the robotic arm in any one of the embodiments of the present disclosure.

BRIEF DESCRIPTION OF THE DRAWINGS

For clearer descriptions of the technical solutions according to the embodiments of the present disclosure, the drawings accompanying the description of some embodiments are briefly introduced below.

FIG. 3 is a flowchart of a method for controlling a robotic arm provided according to an exemplary embodiment of the present disclosure.

FIG. 4 is a schematic diagram of dynamic object placement provided according to an exemplary embodiment of the present disclosure.

FIG. 7 is a flowchart of a method for controlling a robotic arm provided according to an exemplary embodiment of the present disclosure.

FIG. 8 is a schematic diagram of a motion system provided according to an exemplary embodiment of the present disclosure.

DESCRIPTION OF EMBODIMENTS

Figure 1:
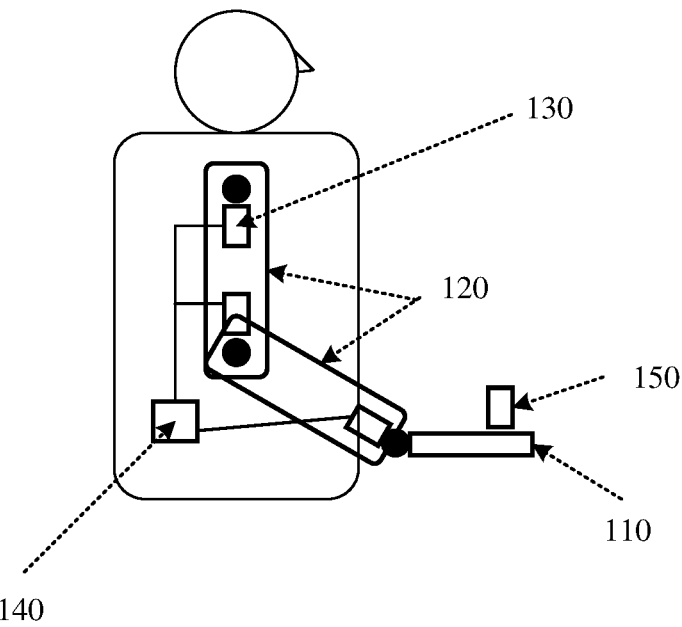
FIG. 1 is a schematic structural diagram of a robotic arm provided according to an exemplary embodiment of the present disclosure.

To make the objectives, technical solutions, and advantages of the present disclosure clearer, the following further describes implementations of the present disclosure in detail with reference to the accompanying drawings. First, terms involved in the embodiments of the present disclosure are explained as follows:

1) Robot: It is an intelligent machine that can work semi-automatically or fully automatically. In some embodiments, this machine possesses some intelligent abilities similar to those of humans or creatures, such as perception, planning, action, and collaboration. It is an automatic machine with high flexibility.

With the deepening of understanding of the intelligent nature of a robot technology, the robot technology begins to be continuously expanded into various fields of human activities. In conjunction with the application characteristics of these fields, people have developed a variety of special robots with perception, decision-making, action, and interaction abilities, and various intelligent robots. A robot is a machine that automatically performs operations. The robot can accept human commands and run pre-programmed programs, or can act based on principles and guidelines formulated using an artificial intelligence technology. Tasks of the robot are usually to assist or replace human work. The robot can be a product of advanced integrated cybernetics, mechatronics, computers, materials, and bionics, and have important applications in industry, medicines, agriculture, service industry, construction industry, and other fields.

Based on application environments, robots can also be divided into two categories, namely, industrial robots and special robots. The industrial robots refer to multi-joint robotic arms or multi-degree-of-freedom robots facing the industrial field. The special robots are various advanced robots, other than the industrial robots, used in non-manufacturing industries and serving humans, including: a bionic robot, a service robot, an underwater robot, an entertainment robot, an agricultural robot, and the like. Among the special robots, some robots have developed rapidly and have a trend of becoming independent systems, such as the service robot, the underwater robot, and a micro operation robot.

There are four types of industrial robots according to a motion form of an arm portion: a rectangular coordinate type arm portion can move along three rectangular coordinates; a cylindrical coordinate type arm portion can perform lifting, rotating, and stretching actions; a spherical coordinate type arm can rotate, pitch, and stretch. An articulated arm portion is provided with a plurality of rotational joints.

A control function of industrial robots according to a motion of an execution mechanism can be divided into a point position manner and a continuous trajectory manner. The execution mechanism controlled in the point position manner is accurately positioned from one point to another position, which is suitable for feeding and discharging of machine tools, spot welding, general handling, loading and unloading operations, and the like. The continuous trajectory type can control the execution mechanism to move according to a given trajectory, which is suitable for continuous welding and coating operations.

The industrial robots are divided into two types based on program inputting methods: a program inputting type and a teaching inputting type. The program inputting type is to transmit working program files that have been programmed on a computer to a robot control cabinet in a communication manner such as a serial port or Ethernet. There are two teaching methods for the teaching inputting type: In one teaching method, an operator uses a manual controller (a teaching control box) to transmit a command signal to a driving system, so that the execution mechanism can perform actions once according to a required action sequence and motion trajectory. In another method, an operator directly leads the execution mechanism to perform actions once according to a required action sequence and motion trajectory. In a teaching process, information of a working program is automatically stored into a program memory. When a robot works automatically, a control system detects the corresponding information from the program memory and transmits command signals to a driving mechanism, so that the execution mechanism performs the various actions that are taught. The industrial robots with a teaching inputting program are referred to as a teaching reproduction type industrial robot.

2) Artificial intelligence (AI): AI involves a theory, a method, a technology, and an application system that use a digital computer or a machine controlled by the digital computer to simulate, extend, and expand human intelligence, perceive an environment, obtain knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

With the research and progress of an AI technology, the AI technology has been studied and applied in many fields, such as common smart homes, smart wearable devices, virtual assistants, smart speakers, smart marketing, unmanned driving, automatic driving, unmanned aerial vehicles, robots, intelligent healthcare, and intelligent customer services. It is believed that with the development of the technology, the AI technology will be applied in more fields and play an increasingly important value.

In the embodiments of the present disclosure, the AI technology can be applied to robots, mainly involving a robot control technology, a machine learning technology, a computer vision technology, and the like.

In the embodiments of the present disclosure, the robot involved has a robotic arm that can be configured to perform an object placement task, that is, to place a target object at a certain target position.

Schematically, FIG. 1 is a schematic structural diagram of a robotic arm provided according to an exemplary embodiment of the present disclosure. The robotic arm can be mounted in a robot. As shown in FIG. 1, the robotic arm includes a carrying component 110, a robotic arm main body 120, a driving motor 130, and a controller 140.

As shown in FIG. 1, the carrying component 110 can be implemented as a plane or plane-like component, which is configured to support a target object 150.

The robotic arm main body 120 is configured to connect the carrying component 110, and the carrying component 110 is connected to the robotic arm main body 120. Exemplarily, one end of the robotic arm main body 120 is connected to a robotic arm supporting component, and one end is connected to the carrying component 110. The robotic arm supporting component may be a robot main body or other supporting components in contact with a supporting surface. In some embodiments, when one end of the robotic arm main body is connected to the robot main body, the carrying component 110 is connected to the other end of the robotic arm main body 120. As an extending portion of the robotic arm main body 120, the carrying component 110 is configured to support and place an object.

The driving motor 130 may be arranged at various joints in the robotic arm to control the respective joints to rotate, so as to drive assemblies connected to the joints to rotate or move.

The controller 140 is connected to the driving motor 130 and is configured to generate a control signal, send the control signal to the driving motor 130, and control operations of the driving motor 130 through the control signal. The controller 140 and the driving motor 130 are connected in an electric way, a wireless way, or other ways capable of achieving signal transmission.

In the embodiments of the present disclosure, the controller 140 may be configured to control the driving motor to drive the carrying component to move, so that the target object moves with the carrying component. The motion that drives the carrying component includes at least one of situations of causing the carrying component to change a pose or to move. Exemplarily, causing the carrying component to change a pose includes causing the carrying component to rotate clockwise or counterclockwise. Causing the carrying component to move includes causing the carrying component to move in any direction to reach another position. In some embodiments, the movement in any direction may be either movement along a straight line or movement along a curve.

As the carrying component moves, the target object may slide on an upper surface of the carrying component under actions of a friction and the gravity and slide away from the carrying component at a target position at a target speed. The target speed is vector data, including a target speed direction and a target speed size.

In summary, the embodiments of the present disclosure relate to a robotic arm. In terms of the robotic arm that includes the carrying component, the robotic arm main body, the driving motor, and the controller, the controller controls the driving motor to drive the carrying component to move, so that the target object slides on the upper surface of the carrying component with the movement of the carrying component under the actions of the friction and the gravity and slides away from the carrying component. In the above control process, the target object is placed dynamically, not statically, through the motion of the carrying component, which can cause actions of placing an object to be continuously performed, thereby improving the efficiency of placing an object.

Figure 2:
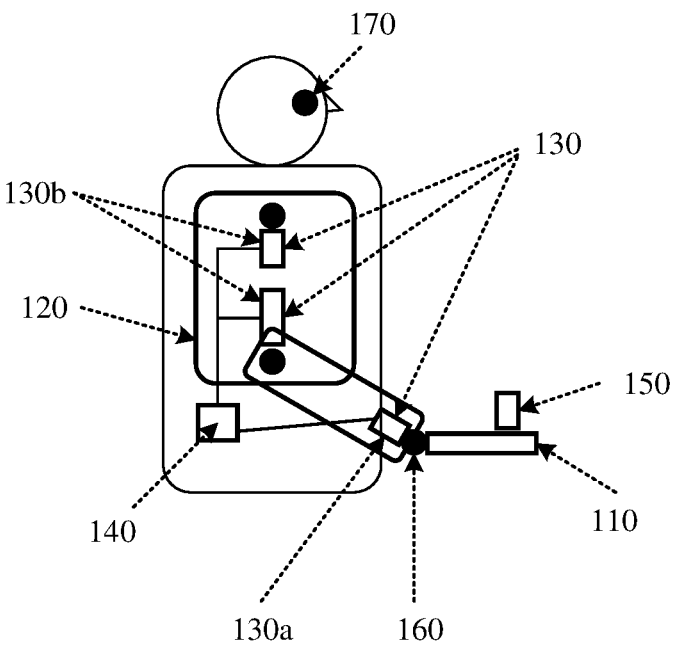
FIG. 2 is a schematic structural diagram of a robotic arm provided according to an exemplary embodiment of the present disclosure.

FIG. 2 is a schematic structural diagram of a robotic arm provided according to an exemplary embodiment of the present disclosure. The robotic arm can be mounted in a robot. As shown in FIG. 2, the robotic arm includes a carrying component 110, a robotic arm main body 120, a driving motor 130, and a controller 140.

As shown in FIG. 1, the carrying component 110 can be implemented as a plane or plane-like component, which is configured to support a target object 150. A surface of the carrying component 110 that is configured to carry the target object 150 may be a rough surface capable of generating friction. Different degrees of roughness of surfaces of the carrying component that carry the target object correspond to different friction coefficients.

The robotic arm main body 120 is configured to connect the carrying component 110, and the carrying component 110 is connected to the robotic arm main body 120. As an extending portion of the robotic arm main body 120, the carrying component 110 is configured to support and place an object.

The driving motor 130 may be arranged at various joints in the robotic arm to control the respective joints to rotate, so as to drive assemblies connected to the joints to rotate or move. A quantity of the driving motor 130 may be the same as a quantity of joints needing to be controlled in the robotic arm. The joints needing to be controlled in the robotic arm may be each joint in the robotic arm or may be some joints in the robotic arm.

The controller 140 is connected to the driving motor 130 and is configured to control the driving motor 130.

In the embodiments of the present disclosure, the controller 140 may be configured to control the driving motor to drive the carrying component, so that the target object slides on an upper surface of the carrying component with the movement of the carrying component under actions of a friction and the gravity and slides away from the carrying component at a target position at a target speed.

In some embodiments, when the controller drives the carrying component to move through the driving motor, the controller may drive the robotic arm main body through the driving motor and drive the carrying component to move through the robotic arm main body.

In some embodiments, the carrying component 110 may be connected to the robotic arm main body 120 through the first joint 160.

The driving motor 130 includes a first driving motor 130a.

The first driving motor 130a is configured to drive the first joint 160 to cause the carrying component 110 to rotate relative to the robotic arm main body 120, so that one side, extending in a first direction, of the carrying component 110 tilts upwards or downwards, and the target object carried by the carrying component 110 forms a certain angle with a horizontal direction, thereby causing the target object to slide under the action of the friction and the gravity in an inclination direction after the carrying component rotates. A rotation direction of the first joint 160 driven by the first driving motor 130*a* may be related to an expected direction in which the target object slides away from the carrying component. For example, it may be the expected direction in which the target object slides away from the carrying component, or a direction opposite to the expected direction in which the target object slides away from the carrying component. A rotation angle of the first joint 160 driven by the first driving motor 130*a* may be related to the degree of roughness of a carrying surface of the carrying component and a weight of the target object. For example, if the degree of roughness of the carrying surface of the carrying component is larger, the rotation angle may be larger. For another example, if the target object is heavier, the rotation angle is larger.

In some embodiments, the carrying component 110 rotates relative to the robotic arm main body 120, which may be rotation around a connecting joint. A rotation manner can be determined based on a connection way between the connecting joint and the carrying component. For example, when the connecting joint and the carrying component are in shaft connection, the carrying component may rotate around a connecting shaft serving as a rotating shaft. When the connecting joint and the carrying component are in spherical connection, the carrying component may rotate around a connecting point serving as a center, so as to improve the control accuracy of the rotating process.

A process of generating a control signal may include the following steps: obtaining a friction coefficient between a target object on the carrying component and the carrying component; constructing a sliding mechanical model based on the friction coefficient; generating target control information based on the sliding mechanical model; and generating a control signal for the driving motor based on the target control information, so that the driving motor drives the carrying component to move, and the target object slides on the upper surface of the carrying component with the movement of the carrying component under the actions of the friction and the gravity and slides away from the carrying component at the target position at the target speed.

The sliding mechanical model is configured to indicate a relationship between a change of generalized coordinates of a motion system and a driving force on the motion system in a process that the carrying component carries the target object and moves. The motion system includes the carrying component and the target object. The target control information including a motion trajectory of the carrying component and driving forces on the motion system at various moments. In the entire control process, the control signal can be precisely generated based on the sliding mechanical model, thereby improving the accuracy of a slide-out speed and slide-out position of the target object in the control process. As a whole, this can improve the efficiency of placing an object.

In one embodiment, the controller is configured to generate a first movement control signal and a first rotation control signal. That is, the control signal generated by the controller includes the first movement control signal and the first rotation control signal. The first movement control signal controls the driving motor to drive the carrying component to move in the first direction to the first position, and the first rotation control signal controls the driving motor to drive the carrying component to rotate until the side, extending in the first direction, of the carrying component tilts downwards, so that the target object slides on the upper surface of the carrying component under the actions of the friction and the gravity and slides away from the carrying component at the target position at the target speed.

A horizontal component of the target speed and a horizontal component of the first direction are in a same direction. By means of controlling the driving motor to drive the carrying component to rotate until the side, extending in the first direction, of the carrying component tilts downwards, the target object can slide away from the carrying component at the target speed from the side extending in the first direction. It is suitable for a scenario where a position of the carrying component after the target object leaves need to be on the same side as an initial position, which can effectively improve the efficiency of placing an object in this scenario.

In another embodiment, the controller is configured to generate a second movement control signal and a second rotation control signal. That is, the control signal generated by the controller includes the second movement control signal and the second rotation control signal. The second movement control signal controls the driving motor to drive the carrying component to move in the second direction to a second position. The second rotation control signal controls the driving motor to drive the carrying component to rotate until one side, extending in the second direction, of the carrying component tilts upwards, so that the target object slides on the upper surface of the carrying component under the actions of the friction and the gravity and slides away from the carrying component at the target position at the target speed.

A horizontal component of the target speed is opposite to a horizontal component of the second direction. By means of controlling the driving motor to drive the carrying component to rotate until the side, extending in the first direction, of the carrying component tilts upwards, the target object can slide away from the carrying component at the target speed from the side extending in the second direction. It is suitable for a scenario where a position of the carrying component after the target object leaves and an initial position need to be on different sides, which can effectively improve the efficiency of placing an object in this scenario.

In some embodiments, the driving motor may include a second driving motor 130*b*.

The second driving motor 130*b* may be configured to drive the carrying component 110 and the robotic arm main body 120 to move. The relative movement between the carrying component 110 and the robotic arm main body 120 can drive the target object carried on the carrying component 110 to have a position change.

The second driving motor 130*b* can be arranged in the middle of the robotic arm main body or at junction portions of the robotic arm main body and a robot main body. In some embodiments, the robotic arm further includes: an image acquisition assembly 170.

The image acquisition assembly 170 is connected to the controller 140. The controller 140 and the image acquisition assembly 170 are connected in an electric way, a wireless way, or other ways capable of achieving signal.

The image acquisition assembly 170 may be configured to acquire an image at the carrying component 110.

The image acquisition assembly 170 and the robotic arm main body may be arranged separately. For example, the image acquisition assembly 170 may be connected to the robot main body.

Or, the image acquisition assembly 170 may also be arranged on the robotic arm main body.

By means of arranging the image acquisition assembly on the robotic arm, images in the carrying component motion control process can be acquired, so as to confirm the position of the carrying component in the motion process. By means of comparing an actual position of image data with an expected position, the control signal can be corrected to ensure that the target object slides on the upper surface of the carrying component with the movement of the carrying component under the actions of the friction and the gravity and slides away from the carrying component at the target position. The interference with the placement process of the object due to a control error is avoided by improving the accuracy of the control signal of the placement process of the target object, which further improves the efficiency for placing an object.

In summary, the embodiments of the present disclosure relate to a robotic arm. In terms of the robotic arm that includes the carrying component, the robotic arm main body, the driving motor, and the controller, the controller controls the driving motor to drive the carrying component to move, so that the target object slides on the upper surface of the carrying component with the movement of the carrying component under the actions of the friction and the gravity and slides away from the carrying component. In the above control process, the target object is placed dynamically, not statically, through the motion of the carrying component, which can cause actions of placing an object to be continuously performed, thereby improving the efficiency of placing an object.

FIG. 3 shows a method for controlling a robotic arm provided according to an exemplary embodiment of the present disclosure. The robotic arm includes a carrying component, a robotic arm main body, and a driving motor, and the carrying component is connected to the robotic arm main body. In some embodiments, the robotic arm may be the robotic arm shown in FIG. 1 or FIG. 2. For example, the method may be performed by a controller. The controller may be the controller in the robotic arm shown in FIG. 1 or FIG. 2, or may be another controller connected to the controller in the robotic arm shown in FIG. 1 or FIG. 2. The following embodiments will explain the method for controlling the robotic arm, which is performed by the controller in the robotic arm. As shown in FIG. 3, the method for controlling the robotic arm includes the following steps:

Step 301: Obtain a friction coefficient between a target object on the carrying component and the carrying component.

Step 302: Construct a sliding mechanical model based on the friction coefficient; the sliding mechanical model being configured to indicate a relationship between a change of generalized coordinates of a motion system and a driving force on the motion system in a process that the carrying component carries the target object and moves; the motion system including the carrying component and the target object.

Step 303: Obtain target control information based on the sliding mechanical model; the target control information including a motion trajectory of the carrying component and driving forces on the motion system at various moments.

Step 304: Drive the carrying component to move through the driving motor based on the target control information, so that along with the movement of the carrying component and under actions of a friction and the gravity, the target object slides on an upper surface of the carrying component and slides away from the carrying component at a target position at a target speed.

In summary, in the solutions shown in the embodiments of the present disclosure, the sliding mechanical model configured to indicate the relationship between the change of the generalized coordinates of the motion system and the driving force on the motion system in the process that the carrying component carries the target object and moves is constructed by using the friction coefficient between the target object on the carrying component and the carrying component; the motion trajectory of the carrying component is then obtained based on the sliding mechanical model; and the driving motor is controlled based on driving forces on the motion system at various moments and the target control information, so that the target object slides on the upper surface of the carrying component with the movement of the carrying component under the actions of the friction and the gravity and slides away from the carrying component, thereby completing the placement of the object. In the above process, the target object is placed dynamically, not statically, through the motion of the carrying component, which can cause actions of placing an object to be continuously performed, thereby improving the efficiency of placing an object.

According to the above solution provided in the embodiments shown in FIG. 3, the robot can dynamically drive the target object to slide on the carrying component by using the robotic arm including the carrying component, so that the target object slides away from the carrying component at a proper position under an inertia effect.

In some embodiments, the controller is configured to generate a first movement control signal. The first movement control signal controls the driving motor to drive the carrying component to move in a first direction to a first position. The controller is also configured to generate a first rotation control signal. The first rotation control signal controls the driving motor to drive the carrying component to rotate to a first target pose. The first target pose is that the side, extending in the first direction, of the carrying component tilts downwards, so that the target object slides on the upper surface of the carrying component under the actions of the friction and the gravity and slides away from the carrying component at the target position at the target speed. A horizontal component of the target speed and a horizontal component of the first direction are in a same direction.

The above process of controlling the driving motor to drive the carrying component to rotate to the first target pose can be started in the process of controlling the driving motor to drive the carrying component to move in the first direction to the first position. Or, the above process of controlling the driving motor to drive the carrying component to rotate to the first target pose can be started during controlling the driving motor to drive the carrying component to move in the first direction to the first position. Or, the above process of controlling the driving motor to drive the carrying component to rotate to the first target pose can be started after controlling the driving motor to drive the carrying component to move in the first direction to the first position.

For example, FIG. 4 shows a schematic diagram of dynamic object placement provided according to an exemplary embodiment of the present disclosure. By way of example, a target object is placed by a robotic arm in an extending manner. As shown in FIG. 4, starting from an initial position a, a driving motor in the robotic arm drives the robotic arm to extend, and a carrying component 41 in the robotic arm moves horizontally to a middle position b. In the continuous horizontal moving process, counterclockwise rotation of the carrying component is controlled to cause the carrying component to reach a middle position c.

A front end is an end of the carrying component 41 that is in the same as a horizontal movement direction, and a rear end is an end of the carrying component 41 that is opposite to the horizontal movement direction. In the continuous horizontal moving process, clockwise rotation of the carrying component is controlled, and the rotation angle is less than a rotation angle when the carrying component reaches the middle position c, so that the carrying component reaches a middle position d. In the continuous horizontal moving process, the carrying component is controlled to continue to rotate clockwise, so that the carrying component is restored to a horizontal position, namely, the carrying component reaches a middle position e. Meanwhile, the target object slides from the carrying component to a tabletop configured to place the target object. The driving motor in the robotic arm drives the robotic arm to move backwards to a final position f. The carrying component may have different speeds and different deflection directions at different positions, so that the target object 42 placed on the carrying component 41 slides relative to the carrying component 41 while the carrying component moves and slides away from the carrying component 41 at the middle position e to the tabletop.

Controlling performed using the above control signal is suitable for a scenario where a position of the carrying component after the target object leaves and an initial position need to be on the same side, which can effectively improve the efficiency of placing an object in this scenario.

In another embodiment, the controller is configured to generate a second movement control signal. The second movement control signal controls the driving motor to drive the carrying component to move in a second direction to a second position. The controller is also configured to generate a second rotation control signal. The second rotation control signal controls the driving motor to drive the carrying component to rotate to a second target pose. The target pose is that the side, extending in the second direction, of the carrying component tilts upwards, so that the target object slides on the upper surface of the carrying component under the actions of the friction and the gravity and slides away from the carrying component at the target position at the target speed. A horizontal component of the target speed and a horizontal component of the second direction are in opposite directions.

The above process of controlling the driving motor to drive the carrying component to rotate to the target pose can be started in the process of controlling the driving motor to drive the carrying component to move in the second direction to the second position. Or, the above process of controlling the driving motor to drive the carrying component to rotate to the target pose can be started during controlling the driving motor to drive the carrying component to move in the second direction to the second position. Or, the above process of controlling the driving motor to drive the carrying component to rotate to the target pose can be started after controlling the driving motor to drive the carrying component to move in the second direction to the second position.

Figures 5, 6:
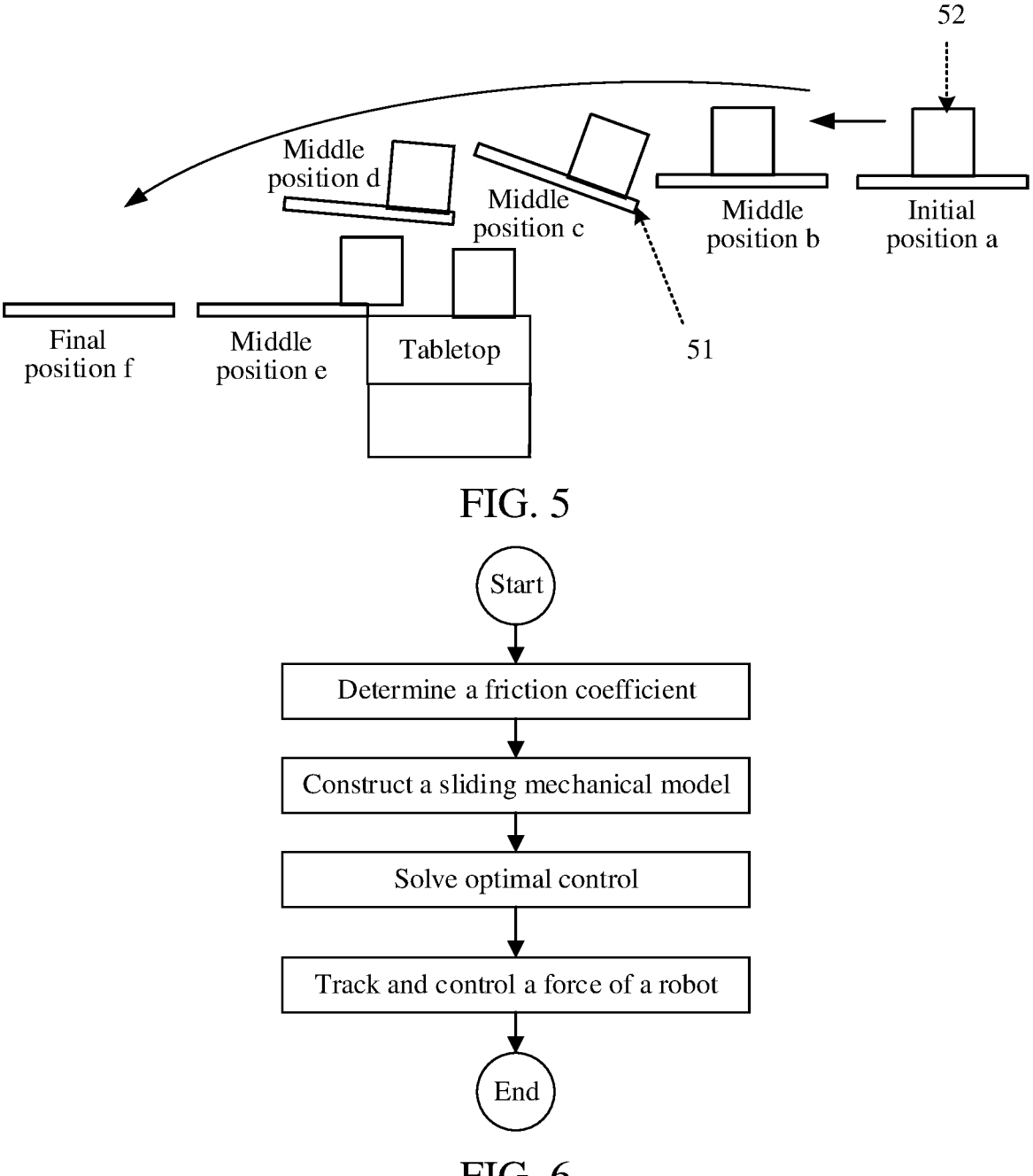
FIG. 5 is a schematic diagram of dynamic object placement provided according to another exemplary embodiment of the present disclosure.
FIG. 6 is an implementation flow of a sliding placement operation according to the present disclosure.

FIG. 5 shows a schematic diagram of dynamic object placement provided according to another exemplary embodiment of the present disclosure. By way of example, a target object is placed by a robotic arm in a retracting manner. As shown in FIG. 5, starting from an initial position a, a driving motor in the robotic arm drives the robotic arm to extend forward, and a carrying component 51 in the robotic arm moves horizontally to a middle position b. In the continuous horizontal moving process, clockwise rotation of the carrying component is controlled to cause the carrying component to reach a middle position c. In the continuous horizontal moving process, counterclockwise rotation of the carrying component is controlled, and the rotation angle is less than a rotation angle when the carrying component reaches the middle position c, so that the carrying component reaches a middle position d. In the continuous horizontal moving process, the carrying component is controlled to continue to rotate counterclockwise, so that the carrying component is restored to a horizontal position, namely, the carrying component reaches a middle position e. Meanwhile, the target object slides from the carrying component to a tabletop configured to place the target object. The driving motor in the robotic arm drives the robotic arm to move backwards to a final position f. The carrying component may have different speeds and different deflection directions at different positions, so that the target object 52 placed on the carrying component 51 slides relative to the carrying component 51 while the carrying component moves and slides away from the carrying component 51 at the middle position e to the tabletop. Controlling performed using the above control signal is suitable for a scenario where a position of the carrying component after the target object leaves and an initial position need to be on different sides, which can effectively improve the efficiency of placing an object in this scenario.

The placement shown in the above embodiments of the present disclosure can have the following advantages:

1) The robot can operate a high-load object at its tail end, and there are no grasping points on the object, so the robot can place the object without grasping with fingers.

2) The placement is quick and convenient. The whole process can be dynamically and smoothly completed.

3) The placement can be completed in conjunction with other dynamic operation actions, such as dynamic transferring and dynamic grasping of the robot.

4) Without relying on complex and expensive multi-fingered hands of a robot, only a simple palm is mounted at the tail end of the robot to achieve complex and dexterous operations.

FIG. 6 shows an implementation flow of a sliding placement operation according to the present disclosure. Execution of the implementation flow can refer to FIG. 7.

FIG. 7 shows a method for controlling a robotic arm provided according to an exemplary embodiment of the present disclosure. The robotic arm includes a carrying component, a robotic arm main body, and a driving motor, and the carrying component is connected to the robotic arm main body. In some embodiments, the robotic arm may be the robotic arm shown in FIG. 1 or FIG. 2. For example, the method may be performed by the controller in the robotic arm shown in FIG. 1 or FIG. 2. As shown in FIG. 7, the method for controlling the robotic arm includes the following steps:

Step 701: Obtain a friction coefficient between a target object on the carrying component and the carrying component.

In some embodiments, the step of obtaining a friction coefficient between a target object on the carrying component and the carrying component includes:

obtaining an image of the target object sliding on the carrying component;

obtaining sliding information of the target object based on the image of the target object sliding on the carrying component; the sliding information including an inclination angle of the carrying component in response to that the target object slides on the carrying component, and an acceleration of sliding of the target object on the carrying component; and obtaining the friction coefficient based on the sliding information.

In some embodiments, the friction coefficient includes a static friction coefficient and a dynamic friction coefficient. The image of the target object sliding on the carrying component includes a first image of the target object sliding on the carrying component at a uniform speed and a second image of the target object sliding on the carrying component at an accelerated speed. The static friction coefficient between the target object and the carrying component can be determined based on the first image, and the dynamic friction coefficient between the target object and the carrying component can be determined based on the second image.

In some embodiments, the carrying component is shaped like a flat plate. For example, the above carrying component can be a flat-plate-shaped mechanical palm at a top end of the robotic arm, so that the target object can smoothly slide out of the flat-plate-shaped mechanical palm.

When the target object slides on the carrying component (for example, the mechanical palm, hereinafter referred to as palm) of the robotic arm, the palm and the target object can be regarded as an integrated motion system. A schematic diagram of the motion system can be as shown in FIG. 8.

In the above figure, {I} represents an inertial coordinate system, and {B} represents a non-inertial body coordinate system on the palm. A pose and motion of the palm can be determined based on a coordinate system {I}, and a pose and motion of an object can be determined based on the coordinate system {B}.

Friction between the object and the palm of the robot is mainly divided into static friction and dynamic friction, and the two types of frictions can be determined by using a static friction coefficient $\mu_0$ and a dynamic friction coefficient $\mu$, respectively.

The static friction coefficient can be obtained by continuously adjusting an inclination angle q of the palm and observing a motion of the object. If $q=q_0$, the object starts to move, and the static friction coefficient can be expressed as follows:

$$\mu_0 = a \tan(q_0)$$

When the inclination angle is greater than $q_0$ and is constant, the object may slide down at a specific acceleration $\ddot{x}$, and the dynamic friction coefficient at this time can be expressed as follows:

$$\mu = a\cos\left(\frac{g\sin(q) - \ddot{x}}{g}\right)$$

In the above formula, the acceleration $\ddot{x}$ of the object can be obtained through visual information and a dynamic capturing system. The visual information and the dynamic capturing system can be implemented through an AI model. The AI model can be trained through machine learning.

Step 702: Construct a sliding mechanical model based on the friction coefficient, the sliding mechanical model being configured to indicate a relationship between a change of generalized coordinates of a motion system and a driving force on the motion system in a process that the carrying component carries the target object and moves.

The motion system includes the carrying component and the target object.

A coordinate of a control point C on the palm in the coordinate system {I} is $C(x_0, y_0)$. A coordinate of the object in the non-inertial body coordinate system of the palm is (x, y). From this, a coordinate of the object in the inertial coordinate system can be further obtained:

$$\begin{bmatrix} x_I \\ y_I \end{bmatrix} = \begin{bmatrix} x_0 \\ y_0 \end{bmatrix} + \begin{bmatrix} \cos(q) & -\sin(q) \\ \sin(q) & \cos(q) \end{bmatrix}\begin{bmatrix} x \\ y \end{bmatrix} = \begin{bmatrix} x_0 \\ y_0 \end{bmatrix} + R\begin{bmatrix} x \\ y \end{bmatrix}$$

where $[x_1, y_1]$ represents a coordinate value of a center of mass of the object in the world coordinate system, and R represents a rotation matrix.

It is assumed that the generalized coordinate of the entire system is X, and $X=[x_0, y_0, q, x, y]^T$. A dynamical model of the entire system is as follows:

$$H(X)\ddot{X}+C(X,\dot{X})\dot{X}+G(X)=F$$

In the above formula:

$$\dot{X} = [\dot{x}_0, \dot{y}_0, \dot{q}, \dot{x}, \dot{y}]^T$$

$$\ddot{X} = [\ddot{x}_0, \ddot{y}_0, \ddot{q}, \ddot{x}, \ddot{y}]^T$$

$$H(X) = \begin{bmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \end{bmatrix}$$

$$C(X, \dot{X}) = \begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \\ C_{41} & C_{42} & C_{43} & C_{44} & C_{45} \\ C_{51} & C_{52} & C_{53} & C_{54} & C_{55} \end{bmatrix}$$

$$G(X) = [\, G_1 \quad G_2 \quad G_3 \quad G_4 \quad G_5 \,]^T$$

$$F = [\, F_1 \quad F_2 \quad F_3 \quad F_4 \quad F_5 \,]^T$$

where H (X), C (X,$\dot{X}$), and G (X) respectively represent an inertial matrix, centrifugal force matrix, and gravitational vector of a sliding system, and F represents a driving force vector. $F_1$ and $F_2$ represent driving forces of the robot in X and Y directions; $F_3$ represents a driving torque of the robot in a rotation direction; $F_4$ represents a friction force of the object on the palm; and $F_5$ represents a supporting force between the object and the palm. The following will introduce the constituent elements of H (X) and C (X, $\dot{X}$):

$$H_{11}=H_{22}=m_1+m_2$$

$$H_{12}=H_{21}=0$$

$$H_{13}=H_{31}=m_2(y\cos(q)-x\sin(q))$$

$$H_{14}=H_{41}=m_2\cos(q)$$

$$H_{15}=H_{51}=m_2\sin(q)$$

$$H_{23}=H_{32}=-m_2(c\cos(q)+y\sin(q)$$

$$H_{24}=H_{42}=m_2\sin(q)$$

$$H_{25}=H_{52}=m_2\cos(q)$$

$$H_{33}=m_2x^2+m_2y^2+I_1+I_2$$

$$H_{34}=H_{43}=m_2y$$

$$H_{53}=-m_2 x$$

$$H_{44}=H_{55}=m_2$$

$$H_{45}=H_{54}=-m_2 x$$

$$C_{11}=C_{12}=C_{21}=C_{22}=C_{31}=C_{32}=C_{41}=C_{42}=C_{51}=C_{52}$$

$$C_{13}=\dot{y} m_2 \cos(q)-\dot{x} m_2 \sin(q)-\dot{q} m_2(x \cos(q)+y \sin(q))$$

$$C_{14}=-\dot{q} m_2 \sin(q)$$

$$C_{15}=\dot{q} m_2 \cos(q)$$

$$C_{23}=-\dot{x} m_2 \cos(q)-\dot{y} m_2 \sin(q)-\dot{q} m_2(y \cos(q)-x \sin(q)$$

$$C_{24}=-\dot{q} m_2 \cos(q)$$

$$C_{25}=-\dot{q} m_2 \sin(q)$$

$$C_{33}=m_2(x\dot{x}+y\dot{y})$$

$$C_{34}=m_2 \dot{q} x$$

$$C_{35}=m_2 \dot{q} y$$

$$C_{43} m_2(\dot{y}-\dot{q} x)$$

$$C_{44}=0$$

$$C_{45}-m_2 \dot{q}$$

$$C_{53}=-m_2(\dot{x}+\dot{q} y)$$

$$C_{54}=-m_2 \dot{q}$$

$$C_{55}=0$$

where m1 in the above formulas represents an equivalent mass of the robotic arm and palm of the robot; $m_2$ represents the mass of the object; $I_1$ represents a rotational inertia of the palm of the robot; and $I_2$ represents a rotational inertia of the object.

Step 703: Obtain target control information based on the sliding mechanical model, the target control information including a motion trajectory of the carrying component and driving forces on the motion system at various moments.

In some embodiments, the above target control information can further include a motion trajectory of the robotic arm.

In some embodiments, the step of obtaining target control information based on the sliding mechanical model includes:

obtaining the target control information based on a control constraint condition by aiming to minimize a motion cost; the control constraint condition includes a sliding mechanical constraint condition represented by the sliding mechanical model; and the motion cost is at least one of motion time, a motion distance, or work of the carrying component in the following process: the carrying component is driven through the driving motor to move, so that the target object slides on the upper surface of the carrying component with the movement of the carrying component under the actions of the friction and the gravity and slides away from the carrying component at the target position at the target speed.

The motion time of the carrying component is time spent in the entire process of placing an object, which is a time difference between a moment when the carrying component starts to move and a moment when the target object leaves the carrying component. The motion distance is a travel corresponding to a motion trajectory of the carrying component from the initial position to the target position where the target object leaves the carrying component. The work is a product obtained by multiplying a force exerted by the carrying component from the initial position to the target position where the target objects leave the carrying component with the motion distance.

The above minimization of the motion cost may include at least one of minimizing the execution time of the motion trajectory (namely, the time spent in the entire process of placing an object), minimizing the distance of the motion trajectory, and minimizing the work of the motion trajectory (namely, the work done by controlling a motor in the entire process of placing an object).

In this embodiment, by taking at least one of the motion time, the motion distance, or the work as the motion cost and aiming to minimize the motion cost, an optimal motion manner for the carrying component from the initial position to the target position where the target object leaves the carrying component can be determined, and a control signal for the efficiency of placing an object can be obtained to control the driving motor and improve the control effect.

In step 702 above, the dynamical model in the sliding operation process is provided. The dynamical model of the sliding operation can be used for optimal control solution for operations of the robot operations. The dynamic sliding operation of the robot is as follows: In the motion process of the robot, a sliding acceleration and sliding speed of the object are changed by adjusting the inclination angle of the palm of the robot, and the object slides out at a specific speed. The target object is placed dynamically, not statically, through the motion of the carrying component, which can cause actions of placing an object to be continuously performed, thereby improving the efficiency of placing an object.

In some embodiments, the process that the target object slides on the carrying component includes a first process of sliding away from the carrying component in a first direction relative to the carrying component.

The control constraint condition includes:

the sliding mechanical constraint condition: s.t.H $(X)\ddot{X}+C$ $(X,\dot{X})\dot{X}+G$ $(X)=F$;

a position constraint condition that the carrying component needs to satisfy at start time of the first process: $X(0)=X_0$; a position constraint condition that the carrying component needs to satisfy at end time of the first process: $X(T)=X_T$;

a speed constraint condition that the target object needs to satisfy at the start time of the first process: $\dot{X}(0)=\dot{X}_0$; and a speed constraint condition that the target object needs to satisfy at the end time of the first process: $\dot{X}(T)=\dot{X}_T$.

A supporting force of the carrying component on the target object is greater than or equal to 0: $F_5 \geq 0$.

where 0 and T represent time when the target object starts to slide from the carrying component and time when the target object slides out of the carrying component, respectively; $X_0$ and $X_T$ are positions that the target object needs to reach at the time of starting the sliding and the time of sliding out; and $\dot{X}_0$ and $\dot{X}_T$ are speeds that the target object needs to achieve at the time of starting the sliding and the time of sliding out, respectively.

According to the requirements of the sliding operation of the robot, the object needs to slide out of an edge at a certain speed at certain time from the initial position while the palm of the robot moves. By way of example, the motion cost includes the execution time of the motion trajectory. The following optimal trajectory generation equations can be listed according to task features:

$$\min \int_0^T \left(1 + \lambda \ddot{X}^T \ddot{X}\right) dt$$

$$\begin{cases} \text{s.t. } H(X)\ddot{X} + C(X, \dot{X})\dot{X} + G(X) = F \\ X(0) = X_0 \\ X(T) = X_T \\ \dot{X}(0) = \dot{X}_0 \\ \dot{X}(T) = \dot{X}_T \\ F_5 \geq 0 \end{cases}$$

In the above formulas, $X_0$ and $X_T$ respectively provide a position of the object on the palm of the robot at sliding start time and a position of the object at final leave time; $\dot{X}_0$ and $\dot{X}_T$ respectively provide a speed of the object on the palm of the robot at the sliding start time and a speed of the object at the final leave time; $F_5 \geq 0$ is mainly to ensure that there is always a contact between the object and the palm; and $\lambda$ represents a weight coefficient of an acceleration optimization term for the robot.

In the above optimal trajectory generation equations, $$\min \int_0^T \left(1 + \lambda \ddot{X}^T \ddot{X}\right) dt$$

indicates that the execution time of the trajectory needs to be minimized; and $\ddot{X}$ represents an acceleration of a sliding system.

According to the above formulas, the motion trajectory of the robot needs to meet its own motion trajectory requirements, and also needs to achieve the sliding of the object on the palm by changing the inclination angle.

That is, in the embodiments of the present disclosure, it is necessary to calculate the motion trajectory and/or inclination angle of the palm of the robot (namely, the positions and poses of the palm at all moments) and then perform inverse kinematics calculation according to the positions and poses of the palm to obtain a joint trajectory of the robot.

The above optimal control equation can be solved through an optimal control software package, such as PSOPT or Open Optimal Control Library (OpenOCL).

In an optimal control stage of the above equation, an optimal trajectory x* and an optimal driving force F* can be obtained.

The above optimal driving force refers to a resultant force on the center of mass of the object and can be calculated according to an inertia force, a centrifugal force, and a gravity term of the object.

In some embodiments, the process of the target object sliding on the carrying component includes:

a second process of sliding from an initial position relative to the carrying component in a second direction relative to the carrying component to a first position relative to the carrying component; and a third process of sliding away from the carrying component from the first position relative to the carrying component in a third direction relative to the carrying component.

The control constraint condition includes:

the sliding mechanical model constraint condition: s.t.H $(X)\ddot{X}+C(X, \dot{X})\dot{X}+G(X)=F$;

a position constraint condition that the carrying component needs to satisfy at start time of the second process: $X(0)=X_0$; a position constraint condition that the carrying component needs to satisfy at start time of the third process: $X(T_1)=X_{T_1}$; a position constraint condition that the carrying component needs to satisfy at end time of the third process: $X(T_2)=X_{T_2}$;

a speed constraint condition that the target object needs to satisfy at the start time of the second process: $\dot{X}(0)=\dot{X}_0$; and a speed constraint condition that the target object needs to satisfy at the start time of the third process: $\dot{X}(T_1)=\dot{X}_{T_1}$; and a speed constraint condition that the target object needs to satisfy at the end time of the third process: $\dot{X}(T_2)=\dot{X}_{T_2}$.

A supporting force of the carrying component on the target object is greater than or equal to 0: $F_5 \geq 0$.

where 0, $T_1$, and $T_2$ represent time when the target object starts to slide from the carrying component, time when the target object slides to the first position of the carrying component, and time when the target object slides out of the carrying component, respectively; $X_0$, $X_{T_1}$, and $X_{T_2}$ represent positions that the target object needs to reach at the time when the target object starts to slide from the carrying component, the time of reaching the first position, and the time of sliding out respectively; and $\dot{X}_0$, $\dot{X}_{T_1}$, and $\dot{X}_{T_2}$ represent speeds that the target object needs to achieve at the time when the target object starts to slide from the carrying component, the time of reaching the first position, and the time of sliding out respectively.

In some embodiments, when the initial position of the target object relative to the carrying component satisfies an adjustment condition, the process of the target object sliding on the carrying component includes: a second process of sliding from an initial position relative to the carrying component in a second direction relative to the carrying component to a first position relative to the carrying component; and a third process of sliding away from the carrying component from the first position relative to the carrying component in a third direction relative to the carrying component. Due to division of different processes, the object placement process is controlled in stages, which can effectively improve the control precision of each process, thereby improving the accuracy in the object placement process and improving the efficiency of placing an object.

In some embodiments, the above adjustment condition includes: the initial position of the target object relative to the carrying component is located at an edge of the carrying component.

In some cases, the initial position of the object is not appropriate. For example, the object is located at the edge at the initial moment. At this time, the above solution cannot provide an effective sliding distance to allow the object to slide out of a contact surface at a certain initial speed. Therefore, it is necessary to use sliding to grasp the object to locate the object at a proper position. A schematic diagram of position adjustment and placement can be shown in FIG. 9.

Figure 9:
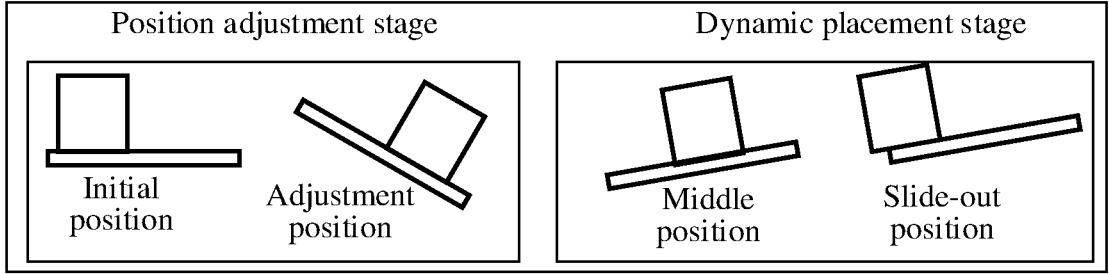
FIG. 9 is a schematic diagram of position adjustment and placement provided according to an exemplary embodiment of the present disclosure.

The sliding operation shown in FIG. 9 above includes two processes. One process is to adjust the position through the sliding operation, and the other process is to dynamically place the object through the sliding operation.

In this case, by way of example, the motion cost includes the execution time of the motion trajectory. The following optimal trajectory generation equations can be listed according to task features:

19

$$\min \int_0^{T_1} \left(1 + \lambda \ddot{X}^T \ddot{X}\right) dt + \int_{T_1}^{T_2} \left(1 + \lambda \ddot{X}^T \ddot{X}\right) dt$$

$$\begin{cases} \text{s.t. } H(X)\ddot{X} + C(X, \dot{X})\dot{X} + G(X) = F \\ X(0) = X_0 \\ X(T_1) = X_{T_1} \\ X(T_2) = X_{T_2} \\ \dot{X}(0) = \dot{X}_0 \\ \dot{X}(T_1) = \dot{X}_{T_1} \\ \dot{X}(T_2) = \dot{X}_{T_2} \\ F_5 \geq 0 \end{cases}$$

In the above optimization model, $T_1$ represents sliding-based position adjustment time; $T_2 - T_1$ represents sliding-based dynamic placement time; and min $$\int_0^{T_1} \left(1 + \lambda \ddot{X}^T \ddot{X}\right) dt + \int_{T_1}^{T_2} \left(1 + \lambda \ddot{X}^T \ddot{X}\right) dt$$

indicates that the execution time of the trajectory needs to be minimized.

In the same way, for multi-stage optimal control, in an optimal control stage of the above equation, an optimal trajectory x* and an optimal driving force F* can be obtained.

Step 704: Obtain a driving torque of the driving motor based on the target control information.

In some embodiments, the controller obtains the target control information through impedance control based on the sliding mechanical model. In the process of impedance control, a grasping force on the target object is determined by the supporting force and friction of the carrying component on the target object.

An object impedance in robot operation refers to an impedance relation between the target object and the robot due to external interaction of the target object after the robot grasps the target object. The object does not interact with another external environment, but the object needs to be in specific contact with the palm, and there is a dynamical equation of the object:

$$M_b \dot{V}^b + C_b (V^b) V^b + N_b (R_{s,b}) = F^b$$

where $M_b$, $C_b$, and $N_b$ respectively represent an inertial matrix, a centrifugal force term matrix, and a gravity term matrix of the object in a non-inertial body coordinate system; $F^b$ represents another external acting force on the object, which mainly refers to an equivalent operating force; $V^b$ and $\dot{V}^b$ refer to a motion speed and acceleration of the object; and $R_{s,b}$ represents a pose of the object.

In order to ensure an effective contact between the object and the palm and a smooth sliding operation, the equivalent operating force of the object and a grasping force of the palm need to satisfy the following relationship:

$$\min(\|F^{b*} - F^b\|^2 + \|F_c\|^2)$$

$$\text{s.t. } F^b = G F_c$$

where $F_c$ represents the grasping force of the palm; G represents a grasping matrix; and $F^{b*}$ represents an expected equivalent operating force. The equivalent operating force of the object refers to a resultant force on the center of mass of the object, and the most direct influence factor of the equivalent operating force is a contact force (namely, the grasping force of the palm above) between the palm and the object. The above contact force is usually a three-dimensional (3D) vector, which contains a force vector and does not contain a torque vector. The vector of the equivalent operating force of the object is usually a six-dimensional (6D) vector, which contains both a force vector and a torque vector.

Considering the dynamics of the robotic arm and an external force on the robotic arm, there is:

$$M_r(\theta)\ddot{\theta} + C_r(\theta, \dot{\theta})\dot{\theta} + N_r(\theta) = \tau - J_r^{bT} F_c$$

where $M_r(\theta)$, $C_r(\theta,\theta)$, and $N_r(\theta)$ respectively represent an inertial matrix, a centrifugal force item matrix, and a gravity matrix which are related to the robot;

$$J_r^{bT}$$

represents a force mapping jacobian matrix; and $\tau$ represents a driving force vector of each joint.

Therefore, a control torque of the robotic arm is as follows:

$$\tau = M_r(\theta)u + C_r(\theta, \dot{\theta})\dot{\theta} + N_r(\theta) + J_r^{bT} F_c$$

$$u = \ddot{\theta}^d + k_p \Delta\theta + k_d \Delta\dot{\theta}$$

$$= J_V^+ \left(\dot{V}^b - \dot{J}_V \dot{\theta}\right) + k_p \Delta\theta + k_d \Delta\dot{\theta}$$

where, u represents a control correction term related to a robot joint acceleration; $k_p$ and $k_d$ represent control coefficients; and $J_v$ represents a mapping jacobian matrix between the cartesian speed of the object and motion of a joint of the robot.

When the object is operated, it is necessary to control a cartesian pose of the robot. In actual control, an underlying controller of the robot needs to control all the joints of the robot, and controlling all the joints is achieved by a joint driving torque. Therefore, in the embodiments of the present disclosure, the controller of the robot needs to calculate a driving torque of the driving motor according to the above formulas.

Step 705: Drive the carrying component to move through the driving motor based on the driving torque, so that along with the movement of the carrying component and under actions of a friction and the gravity, the target object placed on the carrying component slides on an upper surface of the carrying component and slides away from the carrying component at a target position at a target speed.

The motion that drives the carrying component includes at least one of situations of causing the carrying component to change a pose or to move. Exemplarily, causing the carrying component to change a pose includes causing the carrying component to rotate clockwise or counterclockwise, so that a carrying plane of the carrying component tilts. Exemplary, causing the carrying component to move includes causing the carrying component to move in any direction to reach another position (for example, the edge position of the tabletop for placing the target object). In some embodiments, the movement in any direction may be either movement along a straight line or movement along a curve.

It can be seen based on the above content that in the embodiments of the present disclosure, in response to that the target object slides on the upper surface of the carrying component, an acceleration of the target object on the upper surface of the carrying component is controlled by an offset angle of the upper surface of the carrying component relative to a horizontal plane, and resistance to the target object in the sliding process is a sliding friction.

In some embodiments, in the sliding process of the target object on the upper surface of the carrying component, as the inclination angle of the carrying component increases, the acceleration of the target object on the upper surface of the carrying component is greater than 0. Afterwards, the target object starts to slide in an accelerated manner. As the inclination angle of the carrying component changes, the acceleration of the target object on the upper surface of the carrying component can continue to be greater than 0 (the sliding friction is less than a component of the gravity of the target object on the upper surface of the carrying component, and in this case, the target object continues to slide in the accelerated manner), or the acceleration of the target object on the upper surface of the carrying component may be equal to 0 (the sliding friction is less than the component of the gravity of the target object on the upper surface of the carrying component, and in this case, the sliding speed of the target object remains unchanged), or the acceleration of the target object on the upper surface of the carrying component may be less than 0 (the sliding friction is greater than the component of the gravity of the target object on the upper surface of the carrying component, and in this case, the target object starts to decelerate).

In an exemplary solution, in the object placement process, the robot first controls the palm to tilt in a large angle to cause the object to slide in the accelerated manner and then reduces the inclination angle of the palm to cause the object to decelerate and leave the palm.

In another exemplary solution, in the object placement process, the robot first controls the palm to tilt in a large angle to cause the object to slide in the accelerated manner and then reduces the inclination angle of the palm to cause the object to slide at a constant speed and then leave the palm.

In another exemplary solution, in the object placement process, the robot may control the palm to tilt in a large angle to cause the object to slide in the accelerated manner and then cause the object to leave the palm in the acceleration process.

Through the solutions shown in the embodiments of the present disclosure, the above dynamic object placement policy belongs to a dynamic operation of the robot, and main advantages include the following:

1) Dynamic placement can effectively improve the task completion efficiency and can complete a splicing action with other dynamic tasks.

2) Rapid placement of high-mass large-size objects can be effectively completed.

3) An additional loaded end effector cannot be used, and complex tasks can be completed using the palm of the robot or a pallet.

In summary, in the solutions shown in the embodiments of the present disclosure, the sliding mechanical model configured to indicate the relationship between the change of the generalized coordinates of the motion system and the driving force on the motion system in the process that the carrying component carries the target object and moves is constructed by using the friction coefficient between the target object on the carrying component and the carrying component; the motion trajectory of the carrying component is then obtained based on the sliding mechanical model; and the driving motor is controlled based on driving forces on the motion system at various moments and the target control information, so that the target object slides away from the carrying component at the target position at the target speed, thereby completing the placement of the object. In the above process, the target object is placed dynamically, not statically, through the motion of the carrying component, which can cause actions of placing an object to be continuously performed, thereby improving the efficiency of placing an object.

Figure 10:
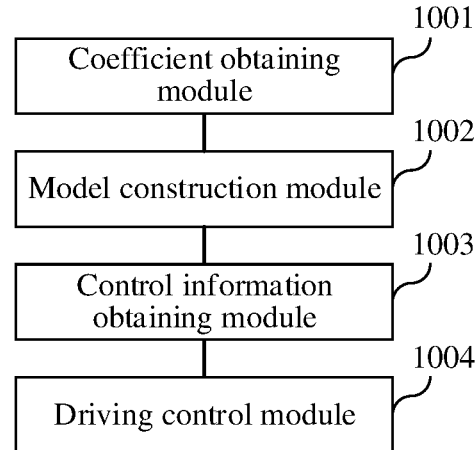
FIG. 10 is a structural block diagram of an apparatus for controlling a robotic arm provided according to an exemplary embodiment of the present disclosure.

FIG. 10 is a structural block diagram of an apparatus for controlling a robotic arm provided according to an exemplary embodiment of the present disclosure. The robotic arm includes a carrying component, a robotic arm main body, and a driving motor, and the carrying component is connected to the robotic arm main body. The apparatus includes:

a coefficient obtaining module 1001, configured to obtain a friction coefficient between a target object on the carrying component and the carrying component;

a model construction module 1002, configured to construct a sliding mechanical model based on the friction coefficient; the sliding mechanical model being configured to indicate a relationship between a change of generalized coordinates of a motion system and a driving force on the motion system in a process that the carrying component carries the target object and moves; the motion system including the carrying component and the target object;

a control information obtaining module 1003, configured to obtain target control information based on the sliding mechanical model; the target control information including a motion trajectory of the carrying component and driving forces on the motion system at various moments;

a driving control module 1004, configured to: drive the carrying component to move through the driving motor based on the target control information, so that the target object slides on an upper surface of the carrying component with the movement of the carrying component under actions of a friction and the gravity and slides away from the carrying component at a target position at a target speed.

In some embodiments, in response to that the target object slides on the upper surface of the carrying component, an acceleration of the target object on the upper surface of the carrying component is controlled by an offset angle of the upper surface of the carrying component relative to a horizontal plane, and resistance to the target object in the sliding process is a sliding friction.

In some embodiments, the control information obtaining module 1003 is configured to obtain the target control information based on a control constraint condition by aiming to minimize a motion cost. The control constraint condition includes the sliding mechanical model; the motion cost is driving the carrying component to move through the driving motor based on the target control information, so that the target object slides on the upper surface of the carrying component with the movement of the carrying component under the actions of the friction and the gravity and slides away from the carrying component at the target position at the target speed.

In some embodiments, the process that the target object slides on the carrying component includes a first process of sliding away from the carrying component in a first direction relative to the carrying component.

The control constraint condition includes:

the sliding mechanical constraint condition;

a position constraint condition that the carrying component needs to satisfy at start time of the first process and end time of the first process;

a speed constraint condition that the target object needs to satisfy at the start time of the first process; and a speed constraint condition that the target object needs to satisfy at the end time of the first process; and a supporting force of the carrying component on the target object is greater than or equal to 0.

In some embodiments, the process of the target object sliding on the carrying component includes:

a second process of sliding from an initial position relative to the carrying component in a second direction relative to the carrying component to a first position relative to the carrying component; and a third process of sliding away from the carrying component from the first position relative to the carrying component in a third direction relative to the carrying component.

The control constraint condition includes:

the sliding mechanical constraint condition;

a position constraint condition that the carrying component needs to satisfy at start time of the second process, start time of the third process, and end time of the third process;

a speed constraint condition that the target object needs to satisfy at the start time of the second process; and a speed constraint condition that the target object needs to satisfy at the start time of the third process; and a speed constraint condition that the target object needs to satisfy at the end time of the third process; and a supporting force of the carrying component on the target object is greater than or equal to 0.

In some embodiments, when the initial position of the target object relative to the carrying component satisfies an adjustment condition, the process of the target object sliding on the carrying component includes: a second process of sliding from an initial position relative to the carrying component in a second direction relative to the carrying component to a first position relative to the carrying component; and a third process of sliding away from the carrying component from the first position relative to the carrying component in a third direction relative to the carrying component.

In some embodiments, the adjustment condition includes: the initial position of the target object relative to the carrying component is located at an edge of the carrying component.

In some embodiments, the control information obtaining module 1003 is configured to obtains the target control information through impedance control based on the sliding mechanical model; and in the process of impedance control, a grasping force on the target object is determined by the supporting force and friction of the carrying component on the target object.

In some embodiments, the coefficient obtaining module 1001 is configured to: obtain an image of the target object sliding on the carrying component;

obtain sliding information of the target object based on the image of the target object sliding on the carrying component; the sliding information including an inclination angle of the carrying component in response to that the target object slides on the carrying component, and an acceleration of sliding of the target object on the carrying component; and obtain the friction coefficient based on the sliding information.

In summary, in the solutions shown in the embodiments of the present disclosure, the sliding mechanical model configured to indicate the relationship between the change of the generalized coordinates of the motion system and the driving force on the motion system in the process that the carrying component carries the target object and moves is constructed by using the friction coefficient between the target object on the carrying component and the carrying component; the motion trajectory of the carrying component is then obtained based on the sliding mechanical model; and the driving motor is controlled based on driving forces on the motion system at various moments and the target control information, so that the target object slides away from the carrying component at the target position at the target speed, thereby completing the placement of the object. In the above process, the target object is placed dynamically, not statically, through the motion of the carrying component, which can cause actions of placing an object to be continuously performed, thereby improving the efficiency of placing an object.

The apparatus provided in the foregoing embodiments is only illustrated by division of all the above functional modules. In practical application, the foregoing functions may be allocated to and completed by different functional modules as required, that is, an inner structure of a device is divided into different functional modules, so as to complete all or some of the functions described above. In addition, the apparatus provided in the foregoing embodiments and the method embodiments fall within the same conception. The term module in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. For details of a specific implementation process of the apparatus, refer to the method embodiments. Details are not described here again.

Figure 11:
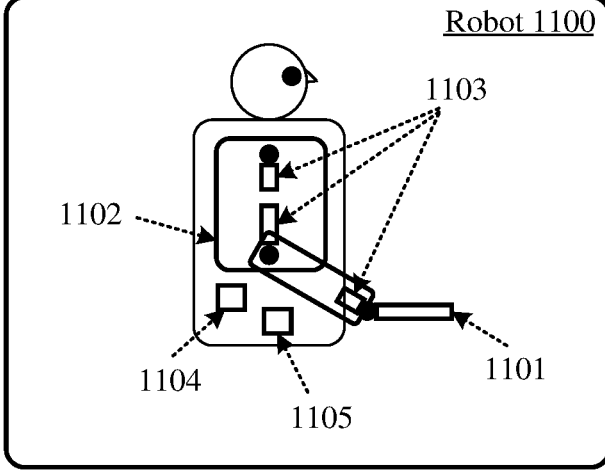
FIG. 11 is a structural block diagram of a robot provided according to an exemplary embodiment of the present disclosure.

FIG. 11 is a structural block diagram of a robot 1100 provided according to an exemplary embodiment of the present disclosure. The robot 1100 may include: a carrying component 1101, a robotic arm main body 1102, a driving motor 1103, a processor 1104, and a memory 1105.

The processor 1104 may include one or more processing cores, for example, a 4-core processor or an 8-core processor. The processor 1104 may be implemented in at least one hardware form of a digital signal processor (DSP), a field-programmable gate array (FPGA), and a programmable logic array (PLA). In some embodiments, the processor 1104 may further include an artificial intelligence (AI) processor. The AI processor is configured to process computing operations related to machine learning.

The memory 1105 may include one or more computer-readable storage media. The computer-readable storage medium may be non-transitory. The memory 1105 may further include a high-speed random access memory and a nonvolatile memory, for example, one or more disk storage devices or flash storage devices. In some embodiments, the non-transitory computer-readable storage medium in the memory 1105 is configured to store at least one instruction, and the at least one instruction is used for being executed by the processor 1104 to implement the method for controlling the robotic arm provided in the method embodiments of the present disclosure.

In some embodiments, the robot 1100 may include: a peripheral interface and at least one peripheral. The processor 1104, the memory 1105, and the peripheral interface may be connected through a bus or a signal wire. Each peripheral may be connected to the peripheral interface through a bus, a signal wire, or a circuit board. In some embodiments, the peripherals may include: at least one of a radio frequency (RF) circuit, a display screen, a camera component, an audio circuit, and a power supply.

The peripheral interface may be configured to connect the at least one peripheral related to input/output (I/O) to the processor 1104 and the memory 1105.

The camera component may be configured to capture images or videos.

In some embodiments, the robot 1100 further includes one or more sensors. The one or more sensors include, but are not limited to: an acceleration sensor, a gyroscope sensor, a pressure sensor, an optical sensor, a proximity sensor, and the like.

A person skilled in the art may understand that the structure shown in FIG. 11 constitutes no limitation on the robot 1100, and the robot may include more or fewer components than those shown in the figure, or some components may be combined, or a different component deployment may be used.

The embodiments of the present disclosure further provide a robot. The robot includes the robotic arm as shown in FIG. 1 or FIG. 2. The controller in the robotic arm may be configured to perform the method for controlling the robotic arm as shown in FIG. 3 or FIG. 7.

The embodiments of the present disclosure further provide a computer-readable storage medium. The computer-readable storage medium stores at least one computer-readable instruction, and the at least one computer-readable instruction is loaded and executed by the one or more processors to implement the methods for controlling the robotic arm provided in all the above method embodiments.

The embodiments of the present disclosure further provide a computer program product or a computer program. The computer program product or computer program includes computer-readable instructions which are stored in a computer-readable storage medium. One or more processors of a computer device (for example, a robot) reads the computer-readable instructions from the computer-readable storage medium, and the one or more processors execute the computer-readable instructions to cause the computer device to perform the method for controlling the robotic arm in any one of the embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequential numbers of the foregoing embodiments of the present disclosure are merely for description purpose but do not imply the preference of the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium mentioned above may be a ROM, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A robotic arm, the robotic arm comprising:
a robotic arm main body;
a carrying component connected to the robotic arm main body; and
a driving motor; and
   a controller connected to the driving motor, configured to generate a control signal that controls the driving motor to drive the carrying component to move,
   wherein the control signal is generated by:
      obtaining a friction coefficient between a target object on the carrying component and the carrying component;
      constructing a sliding mechanical model based on the friction coefficient, the sliding mechanical model being configured to indicate a relationship between a change of generalized coordinates of a motion system and a driving force on the motion system in a process that the carrying component carries the target object and moves, and the motion system comprising the carrying component and the target object; and
      obtaining the control signal based on the sliding mechanical model, the control signal comprising a motion trajectory of the carrying component and driving forces on the motion system at various moments.

2. The robotic arm according to claim 1, wherein the control signal generated by the controller comprises a first movement control signal and a first rotation control signal;
   the first movement control signal controls the driving motor to drive the carrying component to move to a first position along a first direction;
   the first rotation control signal controls the driving motor to drive the carrying component to rotate to a first target pose; the first target pose refers to the carrying component tilting downwards along the first direction; and a horizontal component of a target speed of the target object and a horizontal component of the first direction are in a same direction.

3. The robotic arm according to claim 1, wherein the control signal generated by the controller comprises a second movement control signal and a second rotation control signal;
   the second movement control signal controls the driving motor to drive the carrying component to move to a second position along a second direction;
   the second rotation control signal controls the driving motor to drive the carrying component to rotate to a second target pose; the second target pose refers to the carrying component tilting upwards along the second direction; and a horizontal component of a target speed of the target object and a horizontal component of the second direction are in opposite directions.

4. The robotic arm according to claim 1, wherein the carrying component is connected to the robotic arm main body through a first joint;
   the driving motor comprises a first driving motor; and the first driving motor is configured to drive the first joint to rotate, so that the carrying component rotates around the first joint.

5. The robotic arm according to claim 1, wherein the driving motor comprises a second driving motor; and
the second driving motor is configured to drive the carrying component to move.

6. The robotic arm according to claim 1, wherein the carrying component is a component generating a friction with a target object placed on the carrying component, and the carrying component is a flat plate or a similar flat plate.

7. The robotic arm according to claim 1, wherein the robotic arm further comprises: an image acquisition assembly, connected to the controller, and
the image acquisition assembly is configured to acquire an image at the carrying component.

8. A method for controlling a robotic arm, executed by a controller, the robotic arm comprising a robotic arm main body, a carrying component connected to the robotic arm main body, and a driving motor; the method comprising:
obtaining a friction coefficient between a target object on the carrying component and the carrying component;
constructing a sliding mechanical model based on the friction coefficient, the sliding mechanical model being configured to indicate a relationship between a change of generalized coordinates of a motion system and a driving force on the motion system in a process that the carrying component carries the target object and moves, and the motion system comprising the carrying component and the target object;
obtaining target control information based on the sliding mechanical model, the target control information comprising a motion trajectory of the carrying component and driving forces on the motion system at various moments; and
driving the carrying component to move through the driving motor based on the target control information.

9. The method according to claim 8, further comprising:
in response to that the target object slides on an upper surface of the carrying component, controlling an acceleration of the target object on the upper surface of the carrying component by an offset angle of the upper surface of the carrying component relative to a horizontal plane, and resistance to the target object in the sliding process is a sliding friction.

10. The method according to claim 8, wherein the obtaining target control information based on the sliding mechanical model comprises:
obtaining the target control information based on a control constraint condition by aiming to minimize a motion cost; the control constraint condition comprises a sliding mechanical constraint condition represented by the sliding mechanical model; and
the motion cost is at least one of motion time, a motion distance, or work of the carrying component in the following process: the carrying component is driven through the driving motor to move.

11. The method according to claim 10, wherein a process that the target object slides on the carrying component comprises a first process of sliding away from the carrying component in a first direction relative to the carrying component;
the control constraint condition comprises:
the sliding mechanical constraint condition;
position constraint conditions for the carrying component respectively at a start time of the first process and an end time of the first process;

a speed constraint condition for the target object at the start time of the first process; and
a speed constraint condition for the target object at the end time of the first process; and
a supporting force of the carrying component on the target object being greater than or equal to 0.

12. The method according to claim 10, wherein a process that the target object slides on the carrying component comprises:
a second process of sliding from an initial position relative to the carrying component in a second direction relative to the carrying component to a first position relative to the carrying component; and a third process of sliding away from the carrying component from the first position relative to the carrying component in a third direction relative to the carrying component;
the control constraint condition comprises:
the sliding mechanical constraint condition;
position constraint conditions for the carrying component respectively at a start time of the second process, a start time of the third process, and an end time of the third process;
a speed constraint condition for the target object at the start time of the second process; and
a speed constraint condition for the target object at the start time of the third process; and
a speed constraint condition for the target object at the end time of the third process; and
a supporting force of the carrying component on the target object being greater than or equal to 0.

13. The method according to claim 10, wherein in response to that an initial position of the target object relative to the carrying component satisfies an adjustment condition,
a process that the target object slides on the carrying component comprises: a second process of sliding from the initial position relative to the carrying component in a second direction relative to the carrying component to a first position relative to the carrying component; and a third process of sliding away from the carrying component from the first position relative to the carrying component in a third direction relative to the carrying component.

14. The method according to claim 13, wherein the adjustment condition comprises: the initial position of the target object relative to the carrying component is located at an edge of the carrying component.

15. The method according to claim 8, wherein the obtaining target control information based on the sliding mechanical model comprises:
obtaining the target control information in an impedance control manner based on the sliding mechanical model; and
in a process of impedance control, a grasping force on the target object is determined by the supporting force and friction of the carrying component on the target object.

16. The method according to claim 8, wherein the obtaining a friction coefficient between a target object on the carrying component and the carrying component comprises:
obtaining an image of the target object sliding on the carrying component;
obtaining sliding information of the target object based on the image of the target object sliding on the carrying component; the sliding information comprising an inclination angle of the carrying component in response to that the target object slides on the carrying component, and an acceleration of sliding of the target object on the carrying component; and obtaining the friction coefficient based on the sliding information.

17. A non-transitory computer-readable storage medium, the storage medium storing at least one computer-readable instruction, and the at least one computer-readable instruction being loaded and executed by one or more processors to implement:

obtaining a friction coefficient between a target object on a carrying component of a robotic arm and the carrying component, the robotic arm comprising the carrying component, a robotic arm main body connected to the carrying component, and a driving motor;

constructing a sliding mechanical model based on the friction coefficient, the sliding mechanical model being configured to indicate a relationship between a change of generalized coordinates of a motion system and a driving force on the motion system in a process that the carrying component carries the target object and moves, and the motion system comprising the carrying component and the target object;

obtaining target control information based on the sliding mechanical model, the target control information comprising a motion trajectory of the carrying component and driving forces on the motion system at various moments; and driving the carrying component to move through the driving motor based on the target control information.

18. The storage medium according to claim 17, wherein the at least one computer-readable instruction further cause one or more processors to implement: in response to that the target object slides on an upper surface of the carrying component, controlling an acceleration of the target object on the upper surface of the carrying component by an offset angle of the upper surface of the carrying component relative to a horizontal plane, and resistance to the target object in the sliding process is a sliding friction.

19. The storage medium according to claim 17, wherein the obtaining target control information based on the sliding mechanical model comprises:

obtaining the target control information based on a control constraint condition by aiming to minimize a motion cost; the control constraint condition comprises a sliding mechanical constraint condition represented by the sliding mechanical model; and the motion cost is at least one of motion time, a motion distance, or work of the carrying component in the following process: the carrying component is driven through the driving motor to move.

20. The storage medium according to claim 19, wherein a process that the target object slides on the carrying component comprises a first process of sliding away from the carrying component in a first direction relative to the carrying component;

the control constraint condition comprises:

the sliding mechanical constraint condition;

position constraint conditions for the carrying component respectively at a start time of the first process and an end time of the first process;

a speed constraint condition for the target object at the start time of the first process; and a speed constraint condition for the target object at the end time of the first process; and a supporting force of the carrying component on the target object being greater than or equal to 0.

* * * * *